(No Model.)
C. CARR.
FARINA COOKER.
No. 337,813. Patented Mar. 16, 1886.
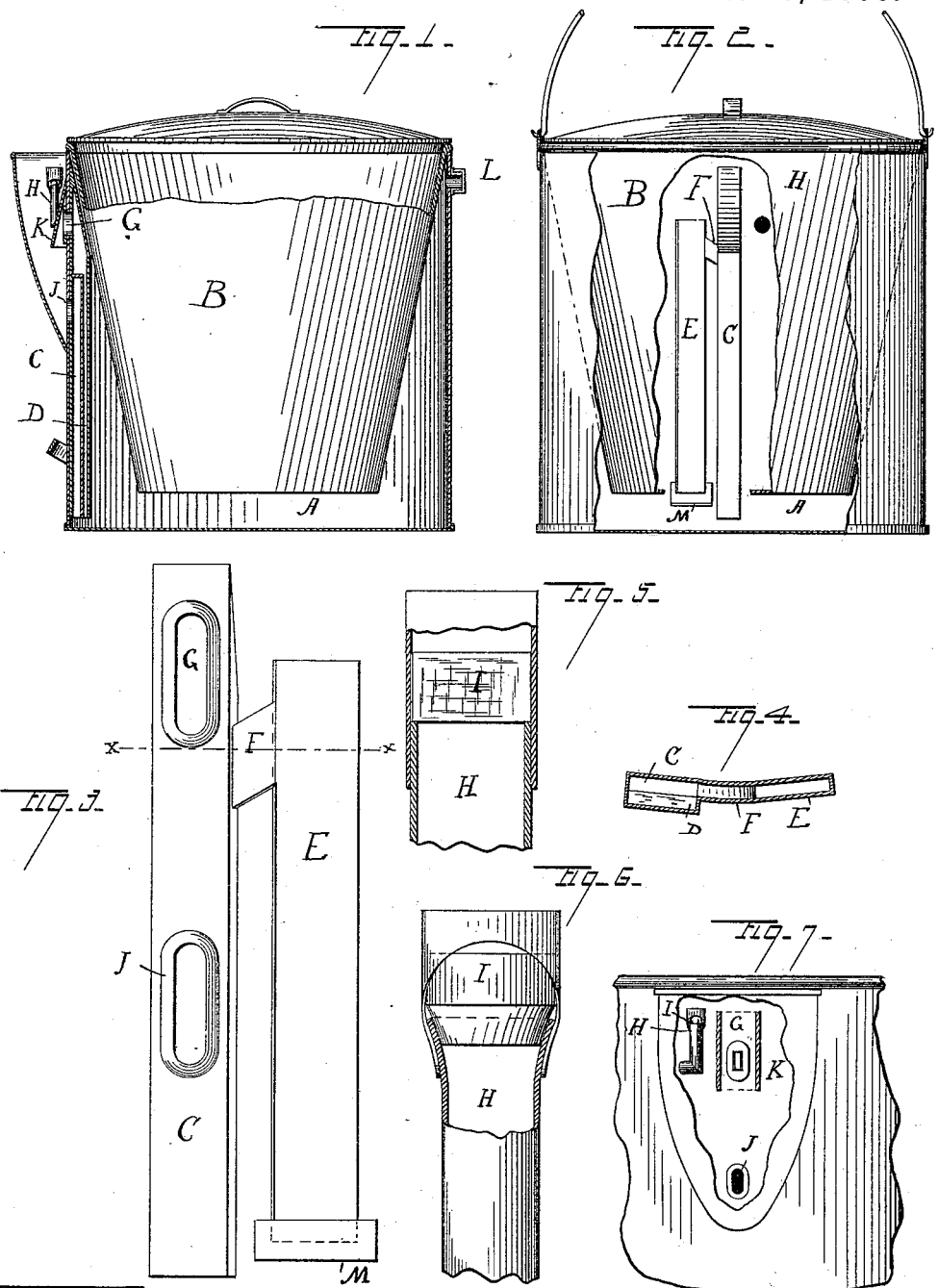
WITNESSES
A. S. Paré
E. P. Hubbard.
INVENTOR
Charles Carr
By Banning & Banning.
Attorneys

UNITED STATES PATENT OFFICE.

CHARLES CARR, OF HYDE PARK, ILLINOIS.

FARINA-COOKER.

SPECIFICATION forming part of Letters Patent No. 337,813, dated March 16, 1886.

Application filed May 11, 1885. Serial No. 165,098. (No model.)

*To all whom it may concern:*

Be it known that I, CHARLES CARR, a citizen of the Dominion of Canada, residing at Hyde Park, Cook county, Illinois, have invented certain new and useful Improvements in Farina-Cookers, of which the following is a specification.

The object of my invention is to make a farina-cooker that will convey a warning to the cook as the water becomes exhausted, so that it can be replenished before the bottom is reached; and my invention consists in the arrangements and features of construction hereinafter described.

In the drawings, Figure 1 shows a vertical sectional view of the outside, and a portion of the inside of the water and cooking compartments of my farina-cooker, showing a portion of the parts by which the water is introduced and the steam permitted to escape in sounding the alarm. Fig. 2 is a side elevation of my farina-cooker, with a portion of the water and cooking compartments broken away to show the rear of the parts by which the water is introduced and the steam permitted to escape in sounding the alarm. Fig. 3 is a front view of the parts by which the water is admitted and the steam permitted to escape in sounding the alarm. Fig. 4 is a transverse sectional view of the same, taken in line $x$ $x$. Figs. 5, 6, and 7 are views of the ordinary steam-egress pipe, showing different-shaped balls or weights at the top, which must be lifted by the steam in its escape.

In the drawings, A represents the water-holding portion of my cooker; B, the portion containing the article or substance to be cooked; C, the tube or pipe by which the water is admitted into the kettle; D, the drain-pipe; E, the pipe for the escape of the steam in sounding the alarm; F, the connection between the drain and the steam pipes; G, the hole provided with a reed or whistle, through which the steam escapes in sounding the alarm; H, the ordinary steam escape or outlet pipe; I, a ball or weight at the top of the same; J, the hole through which the water enters the water part of the vessel; K, the cover or hood by which the reed is protected from dirt or injury; L, a screw-cap to permit the water to be emptied out of the water portion of the vessel; and M is a piece of tin or other metal at the bottom of the steam-alarm pipe.

In making my improved farina-cooker I first make the outside shell, providing it with four holes, for the purposes hereinafter described. I make the second vessel of tapering shape, adapted to be placed in the outside vessel, leaving suitable space at the bottom and around the sides to contain a quantity of water for cooking purposes. This inner vessel is preferably provided with a rim around the top by turning the tin or other metal of which it is composed around a wire, so that this rim thus formed will rest upon the top of the outside vessel, so that the two vessels may be readily and easily soldered together. I solder the two vessels together around the rim, so as to prevent the escape of steam around the edge of the inner vessel. On the inside of the outer vessel, and before the two vessels are soldered together, I solder three pipes or tubes, one behind the other, as represented in Figs. 1 and 4, and one at the side of the other two, and attached to them by a connecting pipe or tube, as shown in Figs. 2, 3, and 4. This third pipe, E, is preferably not soldered against the vessel, but is sustained by means of its connection with the drain-pipe D, and stands out from the wall of the vessel. The pipe C, which rests against the wall of the outer vessel, contains two holes, which, when the tubes are in place, are opposite and corresponding to two of the holes before mentioned in the outer vessel. These two holes in the outer vessel, G and J, are within the spout of the vessel. All three of the pipes are open at the bottom, and the lateral pipe (marked E in the drawings) does not extend quite so near the bottom of the vessel as the other two, and has a piece of tin or other metal attached to it at one side, which is extended somewhat below the end of the pipe, and then turned out at right angles under it, and between the end of the pipe and the bottom of the vessel. Another hole, H, opens from this outer vessel also in the spout, which affords the ordinary means of escape for the steam. It is provided at its top with a ball or other shaped weight that may be lifted by the steam whenever it is sufficiently generated in the vessel to require escape. In Figs. 5, 6, and 7 I have shown three different-shaped weights for this pipe. It is obvious that various shapes may be employed, the object being to retain the steam, so as to secure its heating qualities, until a reasonable pressure is produced. On the opposite side from the spout I have provided the fourth hole in the outer vessel, which is covered with a screw-cap, to permit the water in the outer vessel to be emptied at pleasure. The upper hole, G, is provided with a reed or other sounding instrument or device that will produce a whistle or other loud noise when the steam escapes through it. I have covered this hole so as to prevent the reed from being injured by dirt or other means.

The parts all being in place and soldered fast, the operation is as follows: Water is poured into the spout of the vessel, whence it passes through the opening J into the pipe or tube C, and passes out through the bottom into the water-containing portion of the vessel. When the water begins to boil and to produce steam, the steam will escape through the pipe H when it has acquired sufficient force of pressure to lift the weight. After the water has boiled down until it has become pretty low, and beneath the bottom of the lateral pipe E, the steam, instead of lifting the weight and escaping through the pipe H, will enter the pipe E, pass up such pipe, and pass through the connection into the drain-pipe D, whence it will pass on up and out through the reed in the opening G, producing a shrill whistle or alarm, by which the cook will be notified to replenish the vessel with water.

It will be noticed from Fig. 1 that there is no connection between the drain-pipe D and the water-pipe C. Any water that may be produced by condensation as the steam passes out through the reed G will be carried back by the drain-pipe D to the water portion of the vessel. If the alarm is unheeded, the water will continue to boil down until it has become lower than the bottom of the inlet-pipe C, when it will enter such inlet-pipe, pass up and out through the spout K, at which time the water will be so fully exhausted in the kettle that the same will be in danger of being burned or destroyed. At the bottom of the steam-pipe leading to the alarm I attach a piece of tin or other metal, which I carry down a short distance below the end of the pipe, and turned out under the same between the end of the pipe and the bottom of the vessel. The object of this is to present a surface against which the water bubbling up from the bottom of the vessel will strike and be prevented from entering or being drawn up the bottom of the pipe leading to the alarm. Of course the vessel is provided with a cover, bail, and handle to permit its being lifted and handled as other vessels.

What I regard as new, and desire to secure by Letters Patent, is—

In a farina-cooker, the combination of an outer and an inner vessel, a water-inlet pipe, a steam-outlet pipe, a reed or whistle located in such outlet-pipe, and through which the steam in passing sounds an alarm, a drain-pipe, and a short piece or pipe, F, connecting the water-pipe and the drain-pipe, substantially as described.

CHARLES CARR.

Witnesses:
 E. F. HUBBARD,
 THOMAS A. BANNING.